Patented Dec. 1, 1936

2,062,454

UNITED STATES PATENT OFFICE 2,062,454

MANUFACTURE OF ESSENTIALLY DRY ALKALI METAL ALKYL SULPHATES

Clyde O. Henke and William H. Lockwood, Wilmington, Del., assignors to E. I. du Pont de Nemours & Company, Wilmington, Del., a corporation of Delaware No Drawing. Application June 7, 1935, Serial No. 25,422

6 Claims. (Cl. 260—99.12)

This invention relates to the reaction of alkyl hydrogen sulphates with halogen salts of the alkali metals and more particularly to the reaction of the sulphuric acid esters of coconut oil alcohols with sodium chloride.

It is old to obtain essentially dry alkyl alkali sulphates by sulphating aliphatic alcohols in the presence of a non-aqueous solvent followed by neutralization of the alkyl hydrogen sulphates with an anhydrous base. This process, which is described more fully in Bertsch Patent 1,993,431, is necessarily rather expensive. It is also old to neutralize alkyl hydrogen sulphates with aqueous solutions of sodium hydroxide and to then dry this neutralized product. This latter process suffers from the defect that unsulphated alcohols are volatilized and lost during the drying step.

This invention has as an object the provision of a novel process for obtaining essentially dry alkali metal alkyl sulphates. A further object is to manufacture sodium alkyl sulphates directly in an essentially dry state by an economical and easily conducted process which obviates several defects and disadvantages inherent in methods now known. A still further object is to provide a method of securing solid alkali metal alkyl sulphates without the cost of drying and without the losses which occur on drying. A further object is to reduce manufacturing costs. Another object is to secure products that are superior to those now produced and which have improved detergency due to the presence of a small amount of unsulphated alcohols therein. Other objects will appear hereinafter.

These objects are accomplished by the following invention which provides a process by which sodium alkyl sulphates may be prepared directly in an essentially dry state without the necessity of first neutralizing in aqueous medium and then drying the product which is present commercial practice.

Alkyl hydrogen sulphates which have been prepared by known methods, for example by the reaction of chlorosulphonic acid on alcohols, are treated in a suitable agitated vessel or mixing machine with dry alkali halide which has preferably been powdered. A reaction immediately occurs, hydrogen halide being evolved and alkali alkyl sulphates being formed according to the following equation:

$$R-OSO_3H + MX \rightarrow R-OSO_3M + HX$$

where M is an alkali metal, X is a halogen, R is an alkyl radical, O is oxygen, S is sulphur, and H is hydrogen.

The reaction may not go to completion in which case the required amount of strong caustic solution may be added to the mixture. On continued mixing thereafter the product becomes doughy and finally a powder. This may be stopped at the doughy stage if such a product is desired.

The following examples may be cited to illustrate the use of our invention:

Example 1

To one pound of dry powdered sodium chloride in a mixer was added three and one-half pounds of alkyl hydrogen sulphate which had been prepared by the action of chlorosulphonic acid on that mixture of alcohols which is obtained by the catalytic hydrogenation of coconut oil and subsequent distillation and which consists of normal primary alcohols ranging from and including eight to eighteen carbon atoms. The temperature of the mixer was controlled by a water jacket held at 40–45° C. After mixing for two hours, during which hydrogen chloride was evolved and vented to the air, eleven ounces of fifty per cent sodium hydroxide were added and the mixing continued. After about thirty minutes, a powder was obtained. This powder is ready for use in the same manner as the product prepared in the usual way by aqueous neutralization and subsequent drying.

Example 2

To ten ounces of dry powdered sodium chloride in a mixer was added four pounds of alkyl hydrogen sulphate, derived as in Example 1, and the mass mixed for one hour at a temperature of 40–45° C. and the evolved hydrogen chloride vented to the air. Fifteen ounces of fifty per cent sodium hydroxide solution were added and mixing continued for twenty to thirty minutes. The product was of a doughy consistency which allowed it to be shaped into cakes which hardened on cooling to 20–25° C.

The amount of sodium chloride added may be varied. The theoretical amount may be used, or 50–75% of the theoretical amount may be used, the deficiency being made up with strong caustic. On the other hand, 150–200% or more may be added, the excess salt acting as an inert ingredient. Likewise, other bodies such as bentonite, may also be added with the sodium chloride to act as inert fillers.

While a temperature of 40–45° C. was used in the examples, the reaction will take place at room temperature, and at temperatures as high as 95° C. so that we do not wish to be restricted to a temperature range of 40-45° C. In common with most reactions, the rate of reaction is faster at higher temperatures, and while we have obtained a satisfactory reaction at 95° C., we have usually worked in the range of 40-55° C. since it is more convenient to control the temperature in this range.

We do not wish to limit ourselves to the alcohols derived from coconut oil as illustrated in the above examples, as the reaction is characteristic of other higher molecular weight alcohols both saturated and unsaturated, for instance, technical octadecenyl alcohol from sperm oil. Any of the sulphuric acid esters of higher alcohols which are mentioned in Bertsch Patents 1,968,793; 1,968,794; 1,968,795; and 1,968,797 may be transformed into essentially dry alkali metal salts by treating such sulphuric esters with an alkali metal halide in accordance with the process described above.

In place of using sodium chloride, other alkali metal halides such as sodium bromide, potassium chloride, potassium bromide, etc., may be used. Because of its cheapness, the use of sodium chloride is preferred.

The products obtained are useful for all purposes for which the products mentioned in the aforesaid Bertsch patents may be employed.

This method is advantageous since a dry neutralized product may be obtained from the alkyl hydrogen sulphate without the customary aqueous neutralization and subsequent drying. It is likewise advantageous since a material of the proper consistency for making bars or cakes may be made directly without the customary aqueous neutralization and subsequent drying and milling to the desired consistency. A further essential advantage of the process is that none of the unsulphated alcohols are lost, while in drying aqueous solutions these are volatilized and lost. The unsulphated alcohols, when present up to a certain extent, improve the sudsing and detergent properties of the alkyl sulphates and are thus of value in the finished product.

As many apparently widely different embodiments of this invention may be made without widely departing from the spirit and scope thereof, it is to be understood that the invention is not limited to the specific embodiments thereof except as defined in the appended claims.

We claim:

1. A process of neutralizing alkyl hydrogen sulphates which comprises reacting said sulphates with a dry alkali metal halide under essentially anhydrous conditions with the resultant evolution of a hydrogen halide.

2. A process according to claim 1 in which the alkyl hydrogen sulphates contain at least eight carbon atoms and the alkali metal halide is sodium chloride.

3. A process of preparing alkali metal alkyl sulphates in an essentially dry state which comprises agitating alkyl hydrogen sulphates with a dry alkali metal halide under essentially anhydrous conditions with the resultant evolution of a hydrogen halide.

4. A process according to claim 3 in which the alkyl hydrogen sulphates contain at least eight carbon atoms and the alkali metal halide is sodium chloride.

5. A process of preparing alkali metal alkyl sulphates in an essentially dry state which comprises agitating alkyl hydrogen sulphates which contain at least eight carbon atoms with a dry alkali metal halide under essentially anhydrous conditions until part of the alkyl hydrogen sulphates have been converted into alkali metal alkyl sulphates with the resultant evolution of a hydrogen halide, and completing the reaction by adding a strong caustic solution to the reaction mixture.

6. A process of obtaining essentially dry sodium alkyl sulphates which comprises sulphating the mixture of alcohols contained in hydrogenated coconut oil with chlorosulphonic acid, mixing said sulphated alcohols with dry sodium chloride in a mixing machine while maintaining essentially anhydrous conditions and a temperature of 40-95° C. and permitting the evolution of hydrogen chloride, and completing the reaction by adding a strong sodium hydroxide solution to the mix before the mixing operation is discontinued.

CLYDE O. HENKE.
WILLIAM H. LOCKWOOD.